3,243,435
7-ACYLAMINOCEPHALOSPORANIC ACID DERIVATIVES
Brian Richard Cowley, London, and Gordon Ian Gregory, Chalfont St. Peter, England, John Kevin Lazenby, Grangemouth, Scotland, and Alan Gibson Long, Greenford, Middlesex, England, assignors to Glaxo Laboratories Limited, Middlesex, England, a British company
No Drawing. Filed July 9, 1964, Ser. No. 381,544
Claims priority, application Great Britain, July 15, 1963, 27,989/63; Apr. 9, 1964, 14,747/64
16 Claims. (Cl. 260—243)

This invention is concerned with improvements in or relating to antibiotics and is in particular concerned with derivatives of the antibiotic cephalosporin C which has the structure:

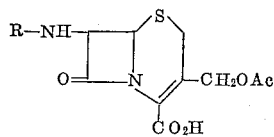

(I)

wherein R is an α-amino-adipoyl group.

In Belgian Patent No. 617,687 there is described the reaction of cephalosporin C, and analogues thereof wherein R is an acyl group other than the a-amino-adipoyl group, with various nucleophiles including sulphur-containing nucleophiles e.g. thiourea and thiophenols. It has now been found that this reaction can be applied to other sulphur containing nucleophiles. Certain of the resulting compounds possess activity against gram-positive organisms and are also of value as intermediates in the preparation of other cephalosporin derivatives. In particular, compounds according to the invention containing a —$CH_2$—S— group attached to the 3-position of the cephalosporin nucleus are of especial value as intermediates in the process of application Serial No. 381,580, filed July 9, 1964, for the production of compounds having potent antibacterial activity.

According to the invention there are provided as new compounds, compounds of the general formula:

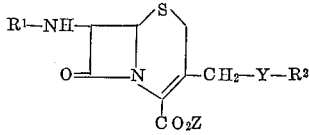

(II)

in which $R^1$ is a carboxylic acyl group or a hydrogen atom;
Y is the group —$SO_2$—; —S—$SO_2$— or —S—CX—, X being a sulphur or oxygen atom;
$R^2$ is an aliphatic, aryl, araliphatic, heterocyclic, or heterocyclic substituted aliphatic group or, where Y is the group —$SO_2$— or —S—CO—, a hydroxyl group, or alkoxyl group respectively and
Z is a cation.

The heterocyclic moieties are preferably 5- or 6-membered rings.

Particularly important compounds according to the invention are those wherein $R^2$ is selected from the group consisting of lower alkyl, phenyl, cyanophenyl, nitrophenyl, loweralkoxyphenyl, loweralkylthiophenyl, loweralkylphenyl, pyridyl, quinolyl, thienyl, thienyl loweralkyl, furyl, furylloweralkyl, hydroxyl where Y is the group —$SO_2$— and lower alkoxyl where Y is the group —S—CO— and Z is selected from the group consisting of hydrogen, alkali metal, ammonium and quaternary ammonium. The term "lower" indicates that the moiety which is so qualified contains 1–4 carbon atoms.

Important examples of such compounds are:

3-benzoylthiomethyl-7-(2′-thienylacetamido)-ceph-3-em-4-oic acid.
4-carboxy-7-phenylacetamidoceph-3-em-3-ylmethyl-p-tolyl sulphone.
3-picolinoylthiomethyl-7-(2′-thienylacetamido)-ceph-3-em-4-oic acid.
3-p-methoxybenzoylthiomethyl-7-(2′-thienylacetamido)-ceph-3-em-4-oic acid.
3-p-nitrobenzoylthiomethyl-7-(2′-thienylacetamido)-ceph-3-em-4-oic acid.
3-p-cyanobenzoylthiomethyl-7-(2′-thienylacetamido)-ceph-3-em-4-oic acid.
3-o-nitrobenzoylthiomethyl-7-(2′-thienylacetamido)-ceph-3-em-4-oic acid.
3-o-methoxybenzoylthiomethyl-7-(2′-thienylacetamido)-ceph-3-em-4-oic acid.
3-thiobenzoylthiomethyl-7-(2′-thienylacetamido)-ceph-3-em-4-oic acid.
3-isonicotinoylthiomethyl-7-(2′-thienylacetamido)-ceph-3-em-4-oic acid.
3-(2′-quinolylcarbonylthiomethyl)-7-(2″-thienylacetamido)-ceph-3-em-4-oic acid.
3-(2′-thienylacetylthiomethyl)-7-(2″-thienylacetamido)-ceph-3-em-4-oic acid.
3-(2′-furoylthiomethyl)-7-(2″-thienylacetamido)-ceph-3-em-4-oic acid.

The compounds according to the invention may be prepared by reaction in a strongly polar medium of a compound of the general formula

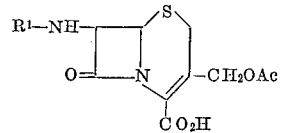

(III)

in which $R^1$ has the meaning defined above, with a compound of the general formula $R^2YH$ (IV) or a soluble salt thereof where $R^2$ and Y have the meanings defined above, the resulting compound where $R^1$ is a hydrogen atom being thereafter, if desired acylated.

Whilst $R^1$ may represent an acyl group in general terms one may use specific acyl derivatives representative of alkanoyl, alkenoyl, substituted alkanoyl e.g. aralkanoyl, aryloxyalkanoyl, S-arylthioalkanoyl and S-aralkylthioalkanoyl etc. These acyl derivatives include those having the general formulae:

(i) $R'(CH_2)_nCO$— where $R'$ is aryl, cycloalkyl, substituted aryl, substituted cycloalkyl or heterocyclic and $n$ is an integer from 1–4. Examples of this group include phenylacetyl, nitrophenylacetyl, phenylpropionyl, cyclopentylactyl, thienyl-2-acetyl, thienyl-3-acetyl and cyclohexylacetyl.

(ii) $C_nH_{2n+1}CO$— where $n$ is an integer from 2–7. The alkyl group may be straight or branched and, if desired, may be interrupted by an oxygen or a sulphur atom or substituted by one or more halogen atoms. Examples of such groups include hexanoyl, heptanoyl, octanoyl and butylthioacetyl.

(iii) $C_nH_{2n-1}CO$— where $n$ is an integer from 2–7. The alkenyl group may be straight or branched and, if desired, may be interrupted by an oxygen or a sulphur atom. Examples of such groups include acrylyl, crotonyl and allylthioacetyl.

(iv) R′OCR″R‴.CO— where R′ has the meaning defined under (i) or is an alkyl group and R″ and R‴ are the same or are different and each is a hydrogen atom or an alkyl, aryl or heterocyclic group. An example of such a group is phenoxyacetyl.

(v) R′SCR″R‴.CO— where R′, R″ and R‴ are as defined above. Examples of such thio groups include S-phenylthioacetyl, S-chlorophenylthioacetyl and S-bromophenylthioacetyl.

(vi) R'(CH$_2$)$_m$S(CH$_2$)$_n$CR"R"'.CO— where R', R" and R"' are as defined above, $m$ is an integer from 1–4 and $n$ is 0 or an integer from 1–4. Examples of such a group include S-benzylthioacetyl, benzylthiopropionyl and β-phenethylthioacetyl.

(vii) R'CO— where R' has the meaning defined above. Examples of such groups include benzoyl, substituted benzoyl and cyclopentanoyl. Where the benzoyl group is substituted the substituents may be alkyl or alkoxy and the substituents may be in the 2- or 2- and 6-positions. An example of a 2,6-disubstituted benzoyl group is, therefore, 2,6-dimethoxybenzoyl.

In general, we prefer that R$^1$ should be selected from acyl groups of section (i).

It should be noted that if desired R$^1$ may be α-aminoadipoyl i.e. the acyl group of cephalosporin C.

The reaction may conveniently be effected by heating the reactants in solution in the strongly polar medium; that is, maintaining the reactants in solution at an elevated temperature, such as, for example, 15–70° C. or even 100° C., preferably 37–100° C., for periods ranging from a few days to a few minutes until the desired derivative is obtained in optimum yield. For example, the reaction proceeds particularly well when carried out at a temperature of about 37° C. for a period of from 48 to 120 hours. The reactants are advantageously employed in a ratio of about 1 molar equivalent of the compound of general Formula III to 1–10 molar equivalents of nucleophile (iv). The pH value of the reaction solution is advantageously maintained within the limits 3.5–8, preferably 4.5–7. If necessary the pH of the solution should be adjusted to the desired value by the addition of a buffering agent such as sodium acetate or, when employing an alkali metal salt of the cephalosporin of the general Formula III, by the addition of, for example, acetic acid.

Since the reaction appears to proceed by a polar or ionic mechanism it is necessary to employ a strongly polar medium for the reaction to proceed at a measurable rate. The most generally suitable solvent is water but in those cases in which the nucleophile is not very soluble in water a mixture of water and a water-miscible organic solvent such as dimethylformamide, acetone or ethanol may be employed.

The course of the reaction may be followed by observing physical characteristics such as ultraviolet and infrared spectra and optical rotation of aliquots withdrawn from the reaction mixture. For example 7-phenylacetamidocephalosporanic acid (PAC), λmax. 260 mμ on reaction in accordance with the invention with thiobenzoic acid gives a derivative λmax. 240–242 and 273–274 mμ, in which the development of the new maxima are associated with introduction of the thiobenzoate residue. (These results apply to the spectra of solutions in ethanol or in an aqueous phosphate buffer at pH 6.) The products where X=O display new absorption (νmax. 1660–1680 cm.$^{-1}$) in the infrared corresponding to the —CO—S— system, and the spectra lack bands due to the acetate group of (III). The displacement is also accompanied by changes in rotation: for PAC and 7-(thienyl-2'-acetamido)-cephalosporanic acid the conversion with thiobenzoate ion proceeds with ΔM$_D$ —990° (dioxan). Paper chromatography shows the disappearance of the starting material in favour of products with different R$_F$ values. Analysis of the products proves that the sulphur:nitrogen ratio has increased from 1:2 to 1:1 in a typical example, which is in keeping with the required conversion.

The reaction product may be separated from the reaction mixture, which may contain, for example, unchanged starting material (III) and other substances, by a variety of processes including crystallisation, ionophoresis, paper chromatography by chromatography on ion-exchange resins or counter-current distribution.

Where the group R$^1$ contains a reactive group, for example a halogen atom the nucleophile may not only displace the acetate group of (III) but may also displace the reactive group in R$^1$.

The group R$^2$ is preferably an aryl or heterocyclic group, especially in the case of compounds where Y is the group —S—CX. In particular, where R$^2$ is a phenyl group and X is an oxygen atom, the compounds were obtained in high yield and in crystalline form. The resulting thiobenzoates possess antibiotic activity and also find particularly utility as intermediates in the preparation of other substances possessing antibiotic activity according to application No. 381,580.

R$^2$ may also be a substituted phenyl group e.g. substituted with cyano, nitro, lower alkoxy or lower alkylthio. The term "lower" indicates that the groups in question have 1–4 carbon atoms.

The process according to the invention also leads to good yields of compounds of Formula II where the group Y—R$^2$ has the formula

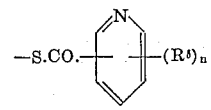

where the —S.CO.— group is attached α, β or γ, preferably α or γ and R$^5$ is a C$_1$–C$_4$ alkyl group or a fused benzene ring and $n$ is 0, 1 or 2, e.g. using thiopicolinic acid or its sodium salt.

Further compounds of Formula II which are obtained in good yield are those having the formula:

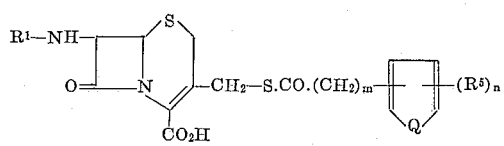

where R$^1$ has the meaning defined above, $m$ is 0 or 1, Q is oxygen, sulphur, NH or N-alkyl (C$_1$–C$_4$) and R$^5$ and $n$ have the above meanings. Where Q=NH it may be necessary to protect the hydrogen atom during the preparation of the thio-acid The compounds according to the invention in which R$^1$ is an acyl group having activity against significant gram positive organisms.

The compounds according to the invention having antibacterial activity may be formulated for administration in any convenient way by analogy with other antibiotic substances, such as penicillin and neomycin, and the invention thus includes within its scope a pharmaceutical composition comprising a compound of general Formula II, in which R$^1$ is an acyl group, adapted for use in human or veterinary medicine. Such compositions may be presented for use in conventional manner with the aid of any necessary pharmaceutical carriers or excipients.

The compounds may thus be made up into injectable preparations either in solution or suspension in suitable media e.g. sterile, pyrogen-free water or as dry preparations suitable for the extempore preparation of injectable preparations. The compositions may further take the form of preparations for topical use e.g. lotions, ointments or creams, formulated with suitable excipients for such preparations. The compositions may also take the form of tablets or capsules or liquids for oral administration.

For verterinary medicine the compounds may be formulated in a manner conventional in veterinary medicine particularly for injection as veterinary cerates.

In general the dosages employed in human medicine on adults will range from 200 mg. per dose upwards, administered for example four times a day.

Solutions and suspensions of the antibacterial substances according to the invention may also contain further solubilising substances, particularly physiologically acceptable water-miscible organic solvents for the active material.

The antibacterial compounds according to the invention may be administered in combination with other antibacterial antibiotics especially the penicillins such as penicillin G and/or tetracyclines.

In order that the invention may be well understood the following examples are given by way of illustration only. In the examples the compounds are named with reference to the substance cepham, viz

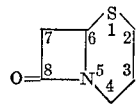

PREPARATIONS 1–11a.—PREPARATION OF THIO-ACIDS AND THEIR SODIUM SALTS

*Method A.*—From the acid chlorides by the method described for thiobenzoic acid (Organic Synthesis, 1952, 32, 101); thioanisic acid (Block and Bergmann, Ber. 1920, 53, 975); p-nitrothiobenzoic acid (Khaletskii and Yanovitskaya, J. Gen. Chem. USSR, 1949, 19, 1193; C. A., 1950, 44, 2952); 2-thiofuroic acid (Patton, J. Amer. Chem. Soc., 1949, 71, 3571); thionicotinic acid (Bohm and Michaloki, Rocznicki Chem., 1954, 28, 501).

*Method B.*—From the mixed anhydride with ethyl chloroformate as described by Cronyn and Jui (J. Amer. Chem. Soc., 1952, 74, 4726).

The properties of the thio-acids or salts thereof are summarized in Table I.

was cooled and the off-white solid collected by filtration and dried to give the crude sodium salt (11.6 g., 46.7%). This material in a mixture of acetone (290 ml.) and water (290 ml.) was shaken with ethyl acetate (500 ml.) and acidified with 2 N-hydrochloric acid (12.5 ml.). The aqueous layer (pH ca. 2) was re-extracted with ethyl acetate (2 x 250 ml.). The combined extracts were washed successively with 10%-sodium chloride (250 ml.) and water (2 x 250 ml.), and dried ($Na_2SO_4$). Evaporation to ca. 50 ml. gave a white crystalline solid (10.44 g., 43.9%), $[\alpha]_D^{28}$ —78.6° (c. 0.85 in dioxan), $\lambda$max. ($H_2O$) 274–276 m$\mu$ ($\epsilon$ 17,500) and 232 m$\mu$ (21,700). (Found: C, 50.8; H, 3.65. $C_{20}H_{17}N_3O_5S_3$ requires C, 50.5; H, 3.6%.) This material gave satisfactory infrared and proton magnetic resonance spectra and showed only one spot when subjected to paper chromatography with an ethyl acetate : n-butanol : 0.1 M-sodium acetate (pH 5.0) (8:1:8) system, with Whatman No. 1 paper buffered with 0.1 M-sodium acetate at pH 5.0.

Yields of 59–63% were obtained by carrying out the reaction at lower pH, e.g. 4.5 to 5. In these examples phosphoric acid was added slowly to the reaction mixture (containing disodium hydrogen phosphate) until the required pH was achieved.

Still higher yields may be obtained by operating at a higher temperature and for a shorter time than above and also by operating at a pH of 3.6 to 4.6, being the natural pH obtained by using a solution of thiopicolinic

TABLE I

| Prep. No. | Formula | Method | M.P. | $\lambda$max., m$\mu$ | $\epsilon$ | Found C | Found H | Found N | Found S | Empirical formula | Requires C | Requires H | Requires N | Requires S |
|---|---|---|---|---|---|---|---|---|---|---|---|---|---|---|
| 1 | p-$CH_3O.C_6H_4COSNa$ | A |  | 261 293 | 9,930 11,500 | 50.4 | 3.9 |  | 16.4 | $C_8H_7O_2SNa$ | 50.5 | 3.7 |  | 16.9 |
| 2 | p-$CN.C_6H_4COSH$ | A |  | 245 290-1 | 17,200 6,460 | 59.2 | 3.2 | 8.9 | 19.1 | $C_8H_5NOS$ | 58.9 | 3.1 | 8.6 | 19.7 |
| 3 | p-$CN.C_6H_4COSNa$ | A |  | 243 290 | 17,350 6,750 | 47.2 | 2.3 | 7.3 | 16.3 | $C_8H_4NOSNa.H_2O$ | 47.3 | 3.0 | 6.9 | 15.8 |
| 4 | o-$NO_2.C_6H_4COSNa$ | A | 90-1 | 249 | 13,070 | 39.5 | 2.4 | 7.0 | 14.8 | $C_7H_4NO_3SNa.\frac{1}{2}H_2O$ | 39.25 | 2.35 | 6.5 | 15.0 |
| 5 | o-$CH_3O.C_6H_4COSNa$ | A | 174-5 | 259 | 6,350 | 49.4 | 4.0 |  | 16.3 | $C_8H_7NaO_2S.\frac{1}{4}H_2O$ | 49.4 | 3.9 |  | 16.5 |
| 6 | o-$CH_3S.C_6H_4COSNa$ | A |  | 258-9 | 9,800 | 47.0 | 3.5 |  | 30.8 | $C_8H_7OS_2Na$ | 46.6 | 3.4 |  | 31.1 |
| 7 | (pyridyl)-COSH | B | 130-1 | 263-4 311-3 | 6,180 4,000 | 51.8 | 3.9 | 10.4 | 22.9 | $C_6H_5NOS$ | 51.8 | 3.6 | 10.1 | 23.0 |
| 8 | (thienyl)-COSNa | A |  | 258 308 | 9,750 8,300 | 34.5 | 2.3 |  | 34.5 | $C_5H_3OS_2Na.\frac{1}{2}H_2O$ | 34.3 | 2.3 |  | 36.6 |
| 9 | (furyl)-COSNa | A |  | 260-1 300 | 8,080 11,600 | 38.3 | 2.8 |  | 18.1 | $C_5H_3O_2SNa.\frac{1}{2}H_2O$ | 37.7 | 2.5 |  | 20.1 |
| 10 | (quinolinyl)-COSH | B | 162 | 239-40 281-2 | 31,600 7,100 | 53.0 | 4.0 | 7.8 | 16.4 | $C_{10}H_7NOS$ | 63.4 | 3.7 | 7.4 | 16.9 |
| 11 | (thienyl)-$CH_2COSNa$ | A |  | 239 | 14,200 |  |  |  |  | $C_6H_5OS_2Na$ |  |  |  |  |
| 11a | (pyridyl)-COSH | B | 160 | 271-3 305inf | 5,000 3,060 | 51.8 | 3.7 | 9.8 | 22.6 | $C_6H_5NOS$ | 51.8 | 3.6 | 10.1 | 23.0 |

*Example 1.—3-picolinoylthiomethyl-7-(2'-thienylacetamido)-ceph-3-em-4-oic acid*

(a) Thiopicolinic acid (13.9 g., 100 mmoles) was dissolved in water (250 ml.) containing sodium bicarbonate (8.4 g., 100 mmoles) and the resulting solution was added to sodium 7-2'-thienylacetamidocephalosporanate (20.9 g.) in water (250 ml.). The solution was heated at 50° for 29 hr. under nitrogen. The mixture acid with sodium-7-(2'-thienylacetamido)-cephalosporanate. This is shown in Example 12(b).

(b) Thiopicolinic acid (6.8 g.) was dissolved in water (150 ml.) at 75° with stirring. Sodium 7-(2'-thienylacetamido)-cephalosporanate (9.93 g.) was added and the mixture (pH=3.6) was stirred at 75° for 2 hours. The thick suspension (pH=4.6) was cooled, stirred at 5° for 1 hour and then filtered. The damp solid was dissolved in a mixture of acetone (240 ml.) and water (80 ml.) at 40°, and concentrated hydrochloric acid (8.5 ml.) was added.

Water (400 ml.) was slowly added and the mixture was cooled to 5°, stirred for 2 hours and filtered. The filter cake was washed with water (25 ml.) and dried at 40° overnight under vacuum. The yield of 3-picolinoylthiomethyl - 7 - (2' - thienylacetamido) - ceph - 3-em-4-oic acid was 83.5% of theory (9.42 g.), $[\alpha]_D$ −79.8° (c., 0.8 in dioxan).

The results of Example 1(a) and further examples of compounds of Formula V ($R^1$=thienyl-2-acetyl) conducted in like manner are summarized in Tables IIa and IIb.

TABLE IIa

| Ex. No. | −YR² (Formula II) | Z=(Formula II) | Temp., °C. | Time (hr.) | Isolation[1] | $[\alpha]_D^2$, deg. | λmax.,[3] mμ | ε[3] | λmax.,[3] mμ | ε[3] |
|---|---|---|---|---|---|---|---|---|---|---|
| 1(a) | −SCO−⟨N⟩ | H | 50 | 29 | A, B | −79 | 274–6 | 17,500 | 232 | 21,700 |
| 2 | −SCO−⟨⟩−OMe | H | 50 | 32 | A | −114 | 289 | 26,100 | 239 | 16,200 |
| 3 | −SCO−⟨⟩−NO₂ | H | 46 | 15.5 | A | −140 | 268–9 | 21,400 | 242–3 | 19,100 |
| 4 | −SCO−⟨⟩−CN | H | 37 | 140 | A | −147 | 276–7 | 20,600 | 233–4 | 30,600 |
| 5 | −SCO−⟨NO₂⟩ | Na / H | 50 | 42.5 | A | −24 / −147 | 266 / 266 | 18,600 / 19,800 | 232–5 / 232–5 | 21,000 / 22,500 |
| 6 | −SCO−⟨CH₃S⟩ | H | 50 | 30 | A | −201 | 234–5 | 31,300 | 273–4 | 17,500 |
| 7 | −S−CO−⟨CH₃O⟩ | H | 50 | 30 | A | −48 | 271–3 | 13,600 | 238–9 | 19,000 |
| 8 | −SCO−⟨S⟩ | H | 50 | 26 | A | −150 | 295–7 | 16,700 | 241–3 | 17,500 |
| 9 | −SCO−⟨O⟩ | H | 50 | 26 | A | −103 | 292 | 22,700 | 232–8 | 15,600 |
| 10 | −SCO−⟨N, quinolyl⟩ | H | 50 | 29 | A | −22.5 | 269–74 | 16,700 | 243–4 | 51,200 |
| 11 | −SCOCH₂−⟨S⟩ | H / H₃N⁺−⟨⟩ | 50 | 31 | C | ———— | 263(Sh) | 12,900 | 236 | 24,100 |
| 12 | −SCS−⟨⟩ | Na / H | 50 | 21.5 | A | −274 / −333 | 298–301 / 296–302 | 16,600 / 15,300 | 229–232 / 229–232 | 19,400 / 18,700 |
| 13 | −SSO₂−⟨⟩−CH₃ | H | 52 | 23 | D | −18 | 270 | 11,700 | 227–8 | 20,200 |
| 14 | −S.CO.(CH₂)₂CH₃ | K | 50 | 16 | B | +3 | 260–263 | 10,500 | 236–7 | 16,000 |
| 14(a) | −S.CO−⟨N⟩ | H | 50 | 29 | A, B | −87 | 273 | 17,800 | 231 | 21,000 |
| 14(b) | −S.CO−⟨N⟩ | H | 60 | 15.5 | A | −82 | 273.4 | 16,400 | ———— | ———— |

[1] Methods of isolation:
  A Insoluble sodium salts formed and either purified as such or converted to the free acid as in the Example.
  B Best yields obtained by carrying out the nucleophilic displacement at pH 5.0.
  C Purified via the cyclohexylamine salt.
  D Crude reaction mixture acidified and purified as free acid.

[2] Optical rotations are for dioxan (c, 1%), except for the sodium salt 5, which was determined in EtOH—H₂O (2:1), the sodium salt 12 and the acids 7, 13, 15a and 15b determined in dimethylsulphoxide, and the potassium salt 15, determined in acetone-water (1:1).

[3] Ultraviolet absorptions are for solutions in 0.1 M-phosphate buffer adjusted to pH 6.0 except for compound 12(Na), which was determined in water and for compounds 7 and 10 which were determined in ethanol.

TABLE IIb

| Ex. No. | Found P | | | | Formula | Requires | | | |
|---|---|---|---|---|---|---|---|---|---|
| | C | H | N | S | | C | H | N | S |
| 1(a) | 51.45 | 3.8 | | | $C_{20}H_{17}N_3O_5S_3$ | 50.5 | 3.6 | | |
| 2 | 53.6 | 4.85 | 4.9 | 17.1 | $C_{22}H_{20}N_2O_6S_3 \cdot C_3H_7OH$ (cryst. from propanol) | 53.2 | 5.0 | 5.0 | 17.0 |
| 3 | 48.6 | 3.6 | 8.2 | 18.6 | $C_{21}H_{17}N_3O_7S_3$ | 48.5 | 3.3 | 8.1 | 18.5 |
| 4 | 53.7 | 3.6 | 8.2 | 19.3 | $C_{22}H_{17}N_3O_5S_3$ | 52.9 | 3.4 | 8.4 | 19.3 |
| 5 | 47.7 | 3.7 | 7.9 | 17.7 | $C_{21}H_{16}N_3O_7S_3Na$ | 46.6 | 3.0 | 7.8 | 17.8 |
| | 47.6 | 3.5 | 8.4 | 17.8 | $C_{21}H_{17}N_3O_7S_3 \cdot \frac{1}{2}H_2O$ | 47.75 | 3.4 | 8.0 | 18.2 |
| 6 | 49.7 | 4.2 | 5.2 | 24.2 | $C_{22}H_{20}N_2O_5S_4$ | 49.9 | 4.0 | 5.3 | 24.2 |
| 7 | 51.9 | 4.1 | 5.8 | 18.7 | $C_{22}H_{20}N_2O_6S_3$ | 52.4 | 4.0 | 5.55 | 19.1 |
| 8 | 47.75 | 3.7 | 5.7 | 26.0 | $C_{19}H_{16}N_2O_5S_4$ | 47.5 | 3.4 | 5.8 | 26.7 |
| 9 | 48.8 | 3.9 | 5.7 | 20.0 | $C_{19}H_{16}N_2O_6S_3$ | 49.1 | 3.5 | 6.0 | 20.7 |
| 10 | 55.7 | 3.9 | 7.8 | 18.0 | $C_{21}H_{19}N_3O_5S_3$ | 54.9 | 3.6 | 8.0 | 18.3 |
| 11 | 52.4 | 5.4 | 6.8 | 21.0 | $C_{26}H_{31}N_3O_5S_4$ | 52.6 | 5.3 | 7.1 | 21.6 |
| 12 | 48.1 | 3.6 | 5.7 | 27.8 | $C_{21}H_{17}N_2O_4S_4Na$ | 49.2 | 3.3 | 5.5 | 25.0 |
| 13 | 47.2 | 3.9 | 5.75 | 23.5 | $C_{21}H_{20}N_2O_5S_4 \cdot \frac{1}{2}H_2O$ | 47.3 | 3.9 | 5.3 | 24.0 |
| 1(a) | 51.1 | 3.6 | 8.5 | 19.7 | $C_{20}H_{17}N_3O_5S_3 \cdot \frac{1}{3}C_3H_6O$* | 51.0 | 3.9 | 8.5 | 19.4 |
| 1(b) | 50.8 | 3.8 | 8.6 | 19.7 | $C_{20}H_{17}N_3O_5S_3$ | 50.5 | 3.6 | 8.8 | 20.2 |

P Infrared spectra (Nujol) and proton magnetic resonance spectra (pyridine) of each compound were consistent with the indicated structure.
*Crystallised from aqueous acetone.

*Example 15.—3-benzoylthiomethyl-7-(2'-thienylacetamido)-ceph-3-em-4-oic acid*

(a) Sodium 7-(2'-thienylacetamido)cephalosporanate (4.27 kg.), sodium thiobenzoate solution (40% w./v.; 5.35 l.), sodium dihydrogen orthophosphate dihydrate (1.88 kg.), orthophosphoric acid (7.27 ml.), and water (27.8 litres) were heated together at 90° with stirring for 1 hr. The controlled pH of the reaction mixture was 4.5 at the start rising to 5.2 at the finish of the reaction. The reaction mixture was cooled to 10° for 30 mins. and the crystalline sodium 3-(benzoylthiomethyl) - 7 - (2' - thienylacetamido) - ceph - 3 - em-4-oate filtered off.

The crude product was dissolved in a mixture of acetone (125 litres) and water (125 litres) at 35° and stirred while concentrated hydrochloric acid (3.5 litres) was slowly added and the mixture cooled to —5° overnight. The crystalline material was filtered off, washed with water and dried at 40° overnight in vacuum to give 3 - benzoylthiomethyl - 7 - (2' - thienylacetamido) ceph-3-em-4-oic acid (4.047 kg., 83.5%), $[\alpha]_D$ —131° (c., 1 in dioxan), $\lambda_{max.}^{EtOH}$ 237–238, 272–275 m$\mu$ ($E_{1cm}^{1\%}$ 481 and 372 respectively)

identified by its infrared spectrum.

(b) 7-thienylacetamidocephalosporanic acid (4.975 g., 12.5 mmoles), sodium bicarbonate (1.05 g., 12.5 m-moles), and sodium thiobenzoate (4.0 g., 25 mmoles) were dissolved in water (125 ml.). The solution was filtered and the filtrate was heated at 50° for 18 hr. in a stream of nitrogen. The crystalline precipitate was collected, washed with water and dried in vacuo over $P_2O_5$ to give sodium 3-benzoylthiomethyl-7(2'-thienyl-acetamido)-ceph-3-em-4-oate (4.39 g., 70.6%), $\nu$max. (Nujol) 1758 ($\beta$-lactam), 1660 (—S—CO—), 1648, 1530 (CONH) and 1625 cm.$^{-1}$ ($CO_2^-$).

The sodium salt was suspended in 50% aq. acetone (50 ml.) and covered with ethyl acetate (100 ml.) while 2N-hydrochloric acid was added. The mixture was shaken until nearly all the solid was dissolved. The acetone was removed in vacuo and the layers were separated. The aqueous layer was extracted with more ethyl acetate (50 ml.), the extracts were combined, washed with water and dried ($MgSO_4$). Evaporation gave a white solid (4.2 g.) which was crystallised from boiling 2:1 acetone-water (180 ml.) to give the title compound (1.6 g., 25.8%), $[\alpha]_D^{26}$ —138° (dioxan), $\lambda$max. (pH 6 phosphate buffer) 238–239 m$\mu$ ($\epsilon$ 23,500), 273–274 m$\mu$ (21,050), $\lambda$max. (Nujol) 1770 ($\beta$-lactam), 1722, 1700 (COOH), 1682 (—SCOPh), 1643, 1538 cm.$^{-1}$ (CONH). (Found: C, 53.4; H, 4.1; N, 6.1; S, 20.0; $C_{21}H_{18}N_2O_5S_3$ requires C, 53.1; H, 3.8; N, 5.9; S, 20.3%.) A second crop (2.337 g.) brought the total yield to 63.5%.

*Example 16.—3-bezoylthiomethyl-7-phenylacetamido-ceph-3-em-4-oic acid*

Thiobenzoic acid (4.14 g., 30 mmoles) was added to a solution of sodium bicarbonate (2.52 g., 30 mmoles) in water (50 ml.) and the mixture warmed for a short time in a stream of nitrogen. A solution of sodium 7-phenylacetamidocephalosporanate (4.125 g., 10 mmoles) in water (50 ml.) was added and the mixture (pH 7.1) was filtered through a kieselguhr pad. The filtrate was heated under nitrogen at 50° for a total of 17.5 hr. Solid precipitates were collected after 2 hr. and at the end of the period; these were combined, washed with water and dried to give the sodium salt (2.345 g.) which was crystallised from aqueous acetone-ethanol to give (1.773 g.), $[\alpha]_D$ —29° (c. 1.12; DMSO), $\lambda$max. (EtOH) 234 ($\epsilon$ 21,200) and 273 m$\mu$ ($\epsilon$ 16,100). (Found: C, 56.1; H, 4.2; N, 5.85; S, 13.3. $C_{23}H_{19}N_2O_5S_2Na$ requires C, 56.3; H, 3.9; N, 5.7; S, 13.1%.) This salt (0.98 g.) was suspended in 50% aqueous acetone (60 ml.) and ethyl acetate (50 ml.) was added. The mixture was acidified to pH 2.0 with 2 N-hydrochloric acid. The ethyl acetate layer was separated; the aqueous layer was further extracted with ethyl acetate (25 ml.). The combined extracts were combined, washed with water and dried over $MgSO_4$. Evaporation gave a white crystalline compound that was triturated with warm acetone-water (3:1; 25 ml.), filtered off and dried to give 3 - benzoylthiomethyl - 7 - phenylacetamidoceph-3-em-4-oic acid (0.85 g.), $[\alpha]_D$ —132° (c. 0.88; dioxan), $\lambda$max. (pH 6.0 buffer) 272 ($\epsilon$ 21,250) and 242 m$\mu$ ($\epsilon$ 17,100). (Found: C, 59.0; H, 4.4; N, 6.3; S, 13.2. $C_{23}H_{20}N_2O_5S_2$ requires C, 59.0; H, 4.3; N, 6.0; S, 13.7%.)

*Example 17.—4-carboxy-7-phenylacetamidoceph-3-em-3-ylmethyl p-tolyl-sulphone*

Sodium 7-phenylacetamidocephalosporanate (5.0 g.) was dissolved in water (15 ml.) and sodium p-toluene-sulphinate (10.8 g., 5 equiv.) was dissolved in a minimum of water (40 ml.). The solutions were filtered through a sintered disk to remove dust and, after mixing, were incubated at 47° for 26 hours (total volume 55–60 ml., including washings).

Separation of the crystalline product began immediately and continued until, after 23 hours, the solution was filled with solid. It was then stirred to promote mixing of the residual reactants, before incubation for a further 4 hours.

After chilling at 0° overnight, the solid was separated by filtration, washed twice with ice-water on the filter and freeze-dried.

The resulting cream powder (4.85 g.) was found, by paper chromatography, to be contaminated with sodium p-toluene sulphinate; this was removed by slurrying twice with ice water (1 x 20 ml., 1 x 10 ml.) and filtering rapidly (the washings appeared to contain appreciable quantities of dissolved product). The product was finally freeze-dried to an off-white powder (3.3 g., 54%)

$\lambda$max. 265 m$\mu$ ($E_{1\,cm}^{1\%}$ 225) and 225 m$\mu$ ($E_{1\,cm}^{1\%}$ 376)

which was homogeneous on paper chromatography in the ethyl acetate and propanol-water systems, and on electrophoresis at pH 7.0. The chromatographic results were: ethyl acetate (8): n-butanol (1): 0.1 M-sodium acetate, adjusted to pH 5 with acetic acid (8): $R_F$ 0.70; n-propanol:water (7:3): $R_F$=0.82.

Analysis of this material showed 40% deficiency in sodium, suggesting that it was a mixture of sodium salt and free acid. This was confirmed by the infrared spectrum $\nu$max. (Nujol) 1755 ($\beta$-lactam), 1650 and 1530 (—CONH—), 1610 (—COO—), 1142 (—SO$_2$—), 810 (para-substituted phenyl), together with weaker bands at 1785 ($\beta$-lactam) and 1730 cm.$^{-1}$ (—COOH).

On dissolving the material in dimethylsulphoxide (200 mg. in 2 ml.) and addition of excess glacial acetic acid (1 ml.), the free acid was precipitated by addition of water. It was obtained by reprecipitation from dimethylsulphoxide as a white powder (140 mg.; 68%), $\lambda$max. 266 m$\mu$ ($E_{1\,cm}^{1\%}$ 195) and 227 m$\mu$ ($E_{1\,cm}^{1\%}$ 324)

(saturated solution in water at 20° C.), $\nu$max. (Nujol) 1785 ($\beta$-lactam), 1730 (—COOH), 1660 and 1643 (—CONH), 1137 (—SO$_2$—), 810 (para-substituted phenyl group). (Found: C, 56.3; H, 4.8; N, 5.1; S, 13.4. $C_{23}H_{22}N_2O_6S_2$ (M.Wt. 486) requires C, 56.8; H, 4.5; N, 5.75; S, 13.2.)

*Example 18.—Reaction of 7-phenylacetamidocephalosporanic acid with thioacetic acid*

The triethylamine salts of 7-phenylacetamidocephalosporanic acid and thioacetic acid, prepared by neutralisation to pH 6.5 of the free acids (0.2 g. and 0.2 g., 5 equivalents respectively), were mixed in aqueous solution (5 ml. approx.). The air was displaced with nitrogen from the reaction flask and this was then sealed and reacted at 37°.

After 65 hours starting material was still apparent, on examination of the paper chromatogram under ultraviolet light, $R_F$ 0.3 [ethyl acetate (8), n-butanol (1), 0.1 M-sodium acetate adjusted to pH 5.0 with acetic acid (8) descending]. In addition a new spot appeared, at $R_F$ 0.56 in the same system. This product was shown by bioautograph to be microbiologically active.

*Example 19.—Reaction of sodium 7-phenylacetamidocephalosporanate with sodium bisulphite*

Sodium 7-phenylacetamidocephalosporanate (53 mg.) and sodium metabisulphite (12.2 mg., 1 equiv.) were dissolved in water (2 ml.) and incubated at 47°. The rotation of the reaction mixture was observed at intervals, but the changes in rotation were identical to those in aqueous solution of sodium 7-phenylacetamidocephalosporanate under similar conditions. After 30 hours, however, a product was evident on examination of the paper chromatograms under ultraviolet light. In the ethyl acetate system it did not move from the origin (i.e. $R_F$ 0.0), in propanol-water (7:3) its $R_F$ was 0.54, and, on electrophoresis, it moved as a monoanion at pH 1.9 [98%-formic acid (17.5 ml.), glacial acetic acid (84 ml.), acetone (105 ml.), water (495 ml.)] and as a dianion at pH 7.0 (0.1 M-phosphate adjusted to pH 7.0 with phosphoric acid). Bioautography revealed that this product was microbiologically active.

*Example 20.—3-O-ethylxanthyl-7-(2'-thienylacetamido)-ceph-3-em-4-oic acid*

7-thienylacetamidocephalosporanic acid (3 g.) was dissolved in water (38 ml.) containing potassium hydrogen carbonate (0.66 g., 1 equiv.) and then potassium O-ethyl xanthate (1.8 g., 1.5 equiv.) was added. The mixture was filtered and incubated under nitrogen at 47° for 23 hours. The pH of the mixture was 6.5.

The reaction mixture was then cooled in an ice-bath and the resultant precipitate removed by filtration. This precipitate was dissolved in 50% aqueous acetone, acidified with 2 N hydrochloric acid and the product extracted into ethyl acetate. The organic extract was dried (MgSO$_4$) and evaporated to give a pale yellow solid (1.2 g., 35%) which after crystallisation from ethyl acetate had M.P. 153–155°. $[\alpha]_D^{25}$=—104° (c.=1.0, dioxan), $\lambda$max. (ethanol) 229 m$\mu$ ($\epsilon$=14,900), 284 m$\mu$ ($\epsilon$=13,300). $\nu$max. (CHBr$_3$), 1790 ($\beta$-lactam), 1740 (—COOH), 1690 and 1515 (—CONH). (Found: C, 44.4; H, 4.0; N, 5.9; S, 27.8. $C_{17}H_{18}N_2O_5S_4$ requires: C, 44.5; H, 4.0; N, 6.2; S, 28.0.)

Chromatographic results: in ethyl acetate (8), n-butanol (1), 0.1 M-sodium acetate (pH 5) (8), $R_F$=0.73.

*Example 21.—S-(7-D-5'-amino-5'-carboxypentanamido-4-carboxy-ceph-3-em-3-ylmethyl)thiobenzoate*

Thiobenzoic acid (28.1 g., 0.203 mole) was dissolved in an aqueous solution of potassium hydroxide (11.4 g., 0.203 mole, in 220 ml. water) and the mixture was filtered and adjusted to pH 7.0 with dilute hydrochloric acid. Cephalosporin C dipotassium salt (50.0 g., 0.102 mole) was added and the mixture was stirred until solution was complete. The pH of the solution (7.4) was adjusted to 6.5 with dilute hydrochloric acid and the mixture heated and stirred under nitrogen at 80° for 50 mins. The mixture was cooled and kept at 0° overnight; the product separated as a white solid and was collected, washed with a little water and dried in vacuo to give the crude potassium salt (17.2 g., 29.8%). Purification by recrystallisation from aqueous acetone gave the compound named in the title, as its monopotassium salt dihydrate, M.P. 208–210° (decomp.), $[\alpha]_D$ —30° (c., 0.992, water), $\lambda$max. (pH 6; 0.1 M-phosphate buffer)

243–244 m$\mu$ ($E_{1\,cm}^{1\%}$ 279, $\epsilon$ 15,800), 273–274 m$\mu$ ($E_{1\,cm}^{1\%}$ 365, $\epsilon$ 20,700)

$\nu$max. (Nujol) 1774, ($\beta$-lactam), 1670 (S—CO), 1650 and 1555 (CO—NH), 1610 (CO$_2^-$) and 690 (phenyl) cm.$^{-1}$. (Found: C, 44.0; H, 4.9; N, 7.2; S, 11.45. $C_{21}H_{22}N_3KO_7S_2$·2H$_2$O requires C, 44.4; H, 4.6; N, 7.4; S, 11.3%.) Paper chromatography (butanol-ethyl acetate pH 5 buffer system) showed a single ninhydrin-positive, biologically active spot on the origin: in the propanol-water system the material had $R_F$ 2.04 relative to cephalosporin C. Electrophoresis showed that the material moved as a base at pH 1.9 and as an acid at pH 7.0.

The aqueous mother liquors (pH 7.3) of the crude product were adjusted to pH 2.0 under a layer of ethyl acetate with concentrated hydrochloric acid, and the aqueous phase was washed with ethyl acetate (1 x 150, 3 x 100 ml.). The aqueous phase was adjusted to pH 2.4 with concentrated potassium hydroxide solution and the resulting precipitated oil was collected by decanting the mother liquors, triturated with water and then with acetone to give the crude cephalosporin C thiobenzoate (free acid) as a very light brown powder (16 g., 32.3%), $[\alpha]_D^{22}$ —50° (c., 0.986, dioxan-water 1:1), $\lambda$max. (pH 6; 0.1 M-phosphate buffer)

241–242 m$\mu$ ($E_{1\,cm}^{1\%}$ 263, $\epsilon$ 13,000), 272 m$\mu$ ($E_{1\,cm}^{1\%}$ 316, $\epsilon$ 15,600)

$\nu$max. (Nujol) 1760 ($\beta$-lactam), 1700 (CO$_2$H), 1650 and 1520 (CO.NH and S.CO), 1620 (CO$_2^-$) and 680 (phenyl) cm.$^{-1}$. (Found: N, 8.1; S, 12.7. $C_{21}H_{23}N_3O_7S_2$ requires N, 8.5; S, 13.0%.) Paper chromatography (propanol-water system) showed a major ultraviolet absorbent, ninhydrin positive, biologically active spot ($R_F$ 2.5 relative to cephalosporin C).

*Example 22.—S-(7-amino-4-carboxyceph-3-em-3-ylmethyl)thiobenzoate*

Thiobenzoic acid (10.17 g., 0.074 mole) was dissolved in an aqueous solution of sodium hydroxide (2.95 g., 0.074 mole in 40 ml. water), the pH was adjusted to 7.0 with 2 N-hydrochloric acid, the mixture was filtered and treated with a solution of 7-amino-cephalosporanic acid (10.0 g., 0.037 mole) in aqueous sodium hydroxide (1.47 g., 0.037 mole in 40 ml. water) at pH 7.0. The reaction mixture was stirred and heated under nitrogen at 75–80° for 45 minutes. After being cooled and kept at 0° for 3 hours a small amount of solid was removed by filtration and the filtrate was adjusted slowly to pH 3.6 (much of the product precipitated before this pH was reached). The product was collected, washed with water, triturated first with ether-acetone (50 ml., 30 ml.) then with acetone (30 ml.) and finally washed with more acetone (3 x 10 ml.) and dried in vacuo yielding the compound named in the title as a light brown powder (6.64 g., 51.5%), λmax. (pH 6; phosphate buffer)

241–242 mµ ($E^{1\%}_{1cm}$ 352), 273–274 mµ ($E^{1\%}_{1cm.}$ 352), 273–274 mµ ($E^{1\%}_{1cm.}$ 433)

νmax. (Nujol) 1800 (β-lactam), 1668 (thiobenzoate), 1530 ($CO_2^-$) and 687 (phenyl) cm.$^{-1}$. (Found: N, 6.1; S, 17.5. $C_{15}H_{14}N_2O_4S_2$ requires N, 8.0; S, 18.3%.) On paper chromatography (propanol-water system) much material (ninhydrin positive) remained near the origin and streaking occurred to a faint (ultraviolet absorbent, ninhydrin positive) spot $R_F$ 0.70 relative to 7-phenyl-acetamidocephalosporanic acid. In the butanol-ethyl acetate-pH 5 buffer system the material showed a major ultraviolet absorbent and ninhydrin positive (yellow) spot at $R_F$ 1.12 relative to 7-phenylacetamidocephalosporanic acid. Elution of the material from a series of these spots ($R_F$ 1.12) from a product obtained in a similar reaction, with 3% sodium bicarbonate, followed by treatment of the eluates with 2-thienylacetyl chloride in acetone for 1 hour at room temperature and examination of the reaction mixture by paper chromatography, indicated the formation during the acylation reaction of a biologically active product with the same $R_F$ values as the authentic thiobenzoate named in the title. Electrophoresis at pH 7.0 showed a major ultraviolet absorbent ninhydrin-positive (yellow) spot which moved as an acid at about half the speed of the 7-aminocephalosporanic acid standard. At pH 1.9 the major spot (ultraviolet absorption) remained on the origin though a faint ultraviolet absorbent spot (streaking) which moved as a base was observed. The ninhydrin colour reaction at this pH was very weak and indefinite.

In Examples 23 and 24, ultraviolet spectra were determined on solutions in pH 6.0 phosphate buffer and infrared spectra on Nujol mulls. Paper chromatography was carried out in the ascending system propanol-water (7:3) and $R_F$ values are quoted relative to 7-phenyl-acetamido-cephalosporanic acid. Electrophoresis was carried out at pH 1.9 using Whatman 3MM paper and a buffer solution (98%-formic acid (17.5 ml.), glacial acetic acid (84 ml.), acetone (105 ml.) and water (495 ml.)).

*Example 23.—S-(7-amino-4-carboxyceph-3-em-3-ylmethyl)thiopicolinate*

7-aminocephalosporanic acid (2.0 g.) was suspended in water (25 ml.) and 2 N-sodium hydroxide solution was added until the solid dissolved and the solution was at pH 7.0. A solution of sodium thiopicolinate (from 1.54 g. of thiopicolinic acid, 1.5 equiv.) in water (25 ml.) was added and the mixture was kept at 35° in an atmosphere of nitrogen for 4 days. The solution was cooled and filtered and the filtrate acidified to pH 5.0. The precipitated solid was the compound named in the title (0.66 g.; 26%); it was dried in vacuo, $[\alpha]_D^{20°}$ −74° (c. 1.00; 3%-$NaHCO_3$), λmax. 229–231 mµ ($E^{1\%}_{1cm.}$ 328; ε 11,500) 273–276 mµ ($E^{1\%}_{1cm.}$ 440, ε 15,400)

νmax. 1800 cm.$^{-1}$ (β-lactam), 1668 cm.$^{-1}$ (—S—C=O) and 1550 cm.$^{-1}$ (—$CO_2^-$), $R_F$ 0.56; electrophoresis at pH 1.9 showed movement as a cation (6.1 cms. at 15 volts per cm.). The compound gave a yellow colour with ninhydrin.

*Example 24.—S-(7-D-5'-amino-5'-carboxypentanamido-4-carboxyceph-3-em-3-ylmethyl)thiopicolinate*

The potassium salt of cephalosporin C (49.6 g.) was dissolved in water (100 ml.) and the solution was adjusted to pH 7.0 with 6% potassium hydroxide solution. Thiopicolinic acid (18.2 g.; 1.2 equiv.) in dilute potassium hydroxide solution (100 ml.) was filtered and adjusted to pH 7.0, then added to the reaction and the mixture was heated at 80° for 1 hr. in an atmosphere of nitrogen. The mixture was cooled and poured into acetone (3 l.) and the precipitated solid was triturated with acetone. The residual solid was dissolved in water (50 ml.) and the solution was adjusted to pH 2.3 with concentrated hydrochloric acid. The aqueous solution was decanted from the separated gum and the gum was washed with water, then triturated with acetone to give the crude title compound as a yellow solid (25.3 g.; 47%), $[\alpha]_D^{20°}$ +7.5° (c. 1.00, 3% $NaHCO_3$), λ max. 228–231 mµ ($E^{1\%}_{1cm.}$ 251; ε 12,400), 271–274 mµ ($E^{1\%}_{1cm.}$ 293, ε 14,500)

$R_F$ 0.33 (impurities, $R_F$ 0.05, $R_F$ 0.21, were present).

The activity of some of the compounds prepared according to the invention is shown in the following table. The *Staph. aureus* strains A and C were penicillin resistant while the strain B was penicillin sensitive.

| Ex. No. | Tube dilution assay (γ/ml.) | | | | | | | Mouse protection ($ED_{50}$/mg./kg./dose) subcutaneous administration | |
|---|---|---|---|---|---|---|---|---|---|
| | Gram-positive | | | Gram-negative | | | | | |
| | Staph. aureus strain A | Staph. aureus strain B | Staph. aureus strain C | E. coli | S. typhimurium | Pr. vulgaris | Ps. pyocyanea | S. aureus strain B | E. coli |
| 1 | 1.25 | 0.08 | 8 | <4 | 250 | 16 | 250 | 10 | >50 |
| 2 | 1.25 | 0.02 | 4 | 4 | 125 | 62.5 | 250 | 15 | >50 |
| 3 | 1.25 | 0.04 | 4 | 31 | 62 | 125 | >250 | 10 | >50 |
| 4 | 0.08 | 0.01 | 4 | 8 | >250 | 125 | >250 | 15 | >50 |
| 5 | 0.16 | 0.04 | <0.5 | <4 | 62.5 | 250 | >250 | 2 | >50 |
| 6 | 0.31 | 0.08 | 8 | 16 | >250 | 250 | >250 | 2.5 | >50 |
| 7 | 0.31 | 0.16 | 4 | 16 | 250 | 250 | >250 | | |
| 8 | 0.08 | 0.02 | 1 | <2 | >250 | 62.5 | 250 | >50 | >50 |
| 9 | 0.31 | 0.04 | 2 | <2 | 16 | 32 | 250 | 15 | >50 |
| 10 | 0.62 | 0.04 | 8 | 125 | 250 | 250 | 250 | | |
| 11 | | | | | | | | | |
| 12 | 0.08 | 0.04 | 2 | 8 | >250 | 31 | >250 | 2.5 | >50 |
| 13 | 2.5 | 0.31 | 4 | 250 | 125 | 250 | 250 | 10 | >50 |
| 14 | 0.31 | 0.04 | 2 | 8 | 31 | 62.5 | >250 | 2.5 | >50 |
| 14a | 0.16 | 0.02 | | 16 | 31 | 125 | >250 | | |
| 15 | 2.5 | | 31 | 8 | 250 | 125 | 250 | 2.5 | >250 |
| 17 | | | | | | | | | |
| 18 | | | | | | | | | |
| 19 | | | | | | | | | |
| 20 | 0.62 | 0.04 | 8 | 16 | 125 | 31 | >250 | 10 | >50 |
| 21 | >2.5 | >2.5 | 31 | >250 | 250 | 125 | >250 | >50 | >50 |
| 24 | | | | | | | | | |

We claim:
1. A compound of the formula:

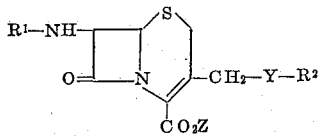

(II)

in which
R¹ is selected from the group consisting of
(a) H
(b) $R^3(CH_2)_nCO$— where $R^3$ is phenyl, nitrophenyl, chlorophenyl, bromophenyl, loweralkoxyphenyl, lower alkylphenyl, cycloalkyl or thienyl and $n$ is an integer from 1 to 4
(c) $R^4CO$— where $R^4$ contains 2–7 carbon atoms and is alkyl, haloalkyl, carboxyalkyl, alkoxyalkyl or alkylthioalkyl
(d) $R^5CO$— where $R^5$ contains 2–7 carbon atoms and is alkenyl, alkylthioalkenyl, alkenylthioalkyl, alkoxyalkenyl or alkenyloxyalkyl
(e) $R^3$—O—$(CH_2)_n$·CO— where $R^3$ and $n$ are as defined above
(f) $R^3$—S—$(CH_2)_n$·CO— where $R^3$ and $n$ are as defined above
(g) $R^3(CH_2)_mS(CH_2)_p(CH_2)$·CO— where $R^3$ is as defined above and $m$ is an integer from 1 to 4 and $p$ is from 0–4
(h) $R^3CO$— where $R^3$ is as defined above
Y is selected from the group consisting of —$SO_2$—; —S—$SO_2$— and —S—CX—;
X is selected from the group consisting of sulphur and oxygen;
R² is selected from the group consisting of lower alkyl, phenyl, cyanophenyl, nitrophenyl, loweralkoxyphenyl, loweralkylthiophenyl, loweralkylphenyl, pyridyl, quinolyl, thienyl, thienyl loweralkyl, furyl, furyl loweralkyl, with the proviso that R² can also be hydroxyl where Y is the group —$SO_2$— and loweralkoxyl where Y is the group —S—CO— and Z is selected from the group consisting of hydrogen, alkali metal, ammonium and quaternary ammonium.

2. A compound as claimed in claim 1 in which R¹ is thienyl-2-acetyl.
3. 3-benzoylthiomethyl-7-(2'-thienylacetamido)-ceph-3-em-4-oic acid.
4. 4-carboxy-7-phenylacetamidoceph-3-em-3-ylmethyl-p-tolyl sulphone.
5. 3-picolinoylthiomethyl-7-(2'-thienylacetamido)-ceph-3-em-4-oic acid.
6. 3-p-methoxybenzoylthiomethyl-7-(2'-thienylacetamido)-ceph-3-em-4-oic acid.
7. 3-p-nitrobenzoylthiomethyl-7-(2'-thienylacetamido)-ceph-3-em-4-oic acid.
8. 3-p-cyanobenzolythiomethyl-7-(2'-thienylacetamido)-ceph-3-em-4-oic acid.
9. 3-o-nitrobenzoylthiomethyl-7-(2'-thienylacetamido)-ceph-3-em-4-oic acid.
10. 3-o-methylthiobenzoylthiomethyl-7-(2'-thienylacetamido)-ceph-3-em-4-oic acid.
11. 3-o-mthoxybenzoylthiomethyl-7-(2'-thienylacetamido)-ceph-3-em-4-oic acid.
12. 3thiobenzoylthiomethyl-7-(2'-thienylacetamido)-ceph-3-em-4-oic acid.
13. 3-isonicotinoylthiomethyl-7-(2'-thienylacetamido)-ceph-3-em-4-oic acid.
14. 3-(2'-quinolylcarbonylthiomethyl)-7-(2''-thienylacetamido)-ceph-3-em-4-oic acid.
15. 3-(2'-thienylacetylthiomethyl)-7-(2''-thienylacetamido)-ceph-3-em-4-oic acid.
16. 3-(2'-furoylthiomethyl)-7-(2''-thienylacetamido)-ceph-3-em-4-oic acid.

No references cited.

HENRY R. JILES, *Acting Primary Examiner.*
JAMES W. ADAMS, *Assistant Examiner.*